United States Patent
Lanman et al.

(10) Patent No.: US 10,989,927 B2
(45) Date of Patent: Apr. 27, 2021

(54) IMAGE FRAME SYNCHRONIZATION IN A NEAR EYE DISPLAY

(71) Applicant: Facebook Technologies, LLC, Menlo Park, CA (US)

(72) Inventors: Douglas Robert Lanman, Bellevue, WA (US); Yang Zhao, Kirkland, WA (US); Bruce A. Cleary, Bothell, WA (US); Olivier Mercier, Redmond, WA (US); Robert Birch, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/696,135

(22) Filed: Nov. 26, 2019

(65) Prior Publication Data

US 2021/0088787 A1    Mar. 25, 2021

Related U.S. Application Data

(60) Provisional application No. 62/902,538, filed on Sep. 19, 2019.

(51) Int. Cl.
*G02B 27/01* (2006.01)

(52) U.S. Cl.
CPC .... *G02B 27/0172* (2013.01); *G02B 2027/011* (2013.01); *G02B 2027/014* (2013.01); *G02B 2027/0116* (2013.01)

(58) Field of Classification Search
CPC .............. G02B 27/017; G02B 27/0172; G02B 27/0134; G02B 27/0075; G02B 27/0093; G02B 2027/011; G02B 2027/0116; G02B 2027/014; G02B 2027/0132; G02B 2027/0138; G02B 2027/0185; G02B 2027/0187
USPC ............................................................ 345/8
See application file for complete search history.

(56) References Cited

U.S. PATENT DOCUMENTS

| 7,447,330 | B2* | 11/2008 | Yamasaki | G02B 3/14 382/100 |
| 8,203,627 | B2* | 6/2012 | Findlay | G02B 27/46 348/240.1 |
| 9,860,537 | B2* | 1/2018 | Lawrence | H04N 19/117 |
| 10,610,775 | B1* | 4/2020 | Ebert | G06F 3/147 |

(Continued)

FOREIGN PATENT DOCUMENTS

WO    2019072363    4/2019

OTHER PUBLICATIONS

PCT/US2020/045542 Search Report dated Oct. 27, 2020.

*Primary Examiner* — Tom V Sheng
(74) *Attorney, Agent, or Firm* — Pequignot + Myers; Matthew A. Pequignot

(57) ABSTRACT

A method includes providing frames of video data for being displayed by a head mounted display (HMD). Pixel data is encoded in a pixel of at least some of the video data frames, the encoded pixel data defining a focal state of an optics block of the HMD for displaying the respective frame of the video data to a user. The predetermined focal state is determined from a plurality of available focal states of the optics block, each focal state corresponding to a different focal plane of a virtual image generated based on the video data. The pixel used for encoding may be disposed outside a region of the frame that is displayable by the HMD.

20 Claims, 8 Drawing Sheets

(56) References Cited

U.S. PATENT DOCUMENTS

| | | | |
|---|---|---|---|
| 2010/0103077 A1* | 4/2010 | Sugiyama | G02B 27/0172 345/8 |
| 2015/0187115 A1* | 7/2015 | MacDonald | G06F 3/013 345/419 |
| 2015/0277129 A1* | 10/2015 | Hua | G02B 27/0101 359/462 |
| 2016/0295202 A1* | 10/2016 | Evans | G02B 3/14 |
| 2017/0160798 A1* | 6/2017 | Lanman | G02B 27/0172 |
| 2017/0262054 A1* | 9/2017 | Lanman | G02B 27/0068 |
| 2017/0293146 A1* | 10/2017 | Nicholls | G02B 27/0172 |
| 2017/0358136 A1* | 12/2017 | Gollier | G06F 1/163 |
| 2018/0203235 A1* | 7/2018 | Fix | G02B 27/0172 |
| 2018/0239145 A1* | 8/2018 | Lanman | G02B 27/0172 |
| 2019/0333480 A1* | 10/2019 | Lang | G02B 27/017 |
| 2019/0369383 A1* | 12/2019 | Nguyen | G02B 27/0176 |
| 2020/0233120 A1* | 7/2020 | Navarro Fructuoso | H04N 13/322 |

* cited by examiner (Frame N)

(Frame N+1)

(Frame N)

(Frame N+1)

IMAGE FRAME SYNCHRONIZATION IN A NEAR EYE DISPLAY

REFERENCE TO RELATED APPLICATION

The present application claims priority from U.S. Provisional Application No. 62/902,538 entitled "IMAGE FRAME SYNCHRONIZATION IN A NEAR EYE DISPLAY BACKGROUND", filed on Sep. 19, 2019, and incorporated herein by reference in its entirety.

FIELD

The present disclosure relates generally to near eye display devices. More particularly, the present disclosure relates to synchronizing the display of objects in a scene with a depth position or visual accommodation of the displayed objects.

BACKGROUND

Head-mounted displays (HMDs) can be used to simulate virtual environments for display to a user in an artificial reality system. For example, stereoscopic images can be displayed on an display module inside the HMD to simulate the illusion of depth, and head tracking sensors can be used to estimate what portion of the virtual environment is being viewed by the user. Such a simulation, however, can cause visual fatigue and nausea resulting from an inability of existing HMDs to correctly render or otherwise compensate for vergence and accommodation conflicts.

Typically, eyes converge (rotate toward one another) to focus on closer objects and diverge (rotate away from one another) to focus on objects that are further away. The vergence therefore represents the simultaneous movement of both eyes in opposite directions to obtain or maintain single binocular vision. Accommodation is coupled with vergence and is the process where the lenses of the eyes focus on a close or far away object. During accommodation of an eye, a lens of the eye changes optical power to maintain a sharp, in-focus image of an object as the object's distance from the viewer varies.

Some HMDs may display objects in a virtual or augmented reality scene at different perceived distances by using the stereoscopic effect, as well as by placing different virtual objects at different focal planes or focusing states. The perceived stereoscopic image depth and position of the virtual objects needs to be accompanied by corresponding focal positions and the focusing distances of the virtual objects, to reduce the fatigue or nausea caused by vergence/accommodation conflict.

SUMMARY

In accordance with an aspect of at least one embodiment there is provided a head mounted display (HMD) comprising: a display module for providing image light; an optics block configured to receive the image light from the display module and to provide a virtual image carried by the image light, the optics block having a plurality of focal states each corresponding to a different focal plane of the virtual image; a varifocal module configured to selectably switch the optics block between different focal states of the plurality of focal states; and a controller configured to: receive a frame of video data for displaying by the HMD, the frame including pixel data encoded in a first pixel of the frame, the pixel data being indicative of one of the plurality of focal states of the optics block; and, prior to displaying the frame using the HMD: read the pixel data; and use the varifocal module to set the optics block to the focal state indicated by the pixel data.

In accordance with an aspect of at least one embodiment there is provided a method of controlling a head mounted display (HMD), the method comprising: obtaining video data comprising a frame for displaying by the HMD; and encoding first pixel data into a first pixel of the frame, the encoded first pixel data being indicative of a focal state of an optics block of the HMD for displaying the frame, the focal state selected from a plurality of focal states of the optics block, each focal state corresponding to a different focal plane of a virtual image, wherein the virtual image is based on the frame of the video data.

In accordance with an aspect of at least one embodiment there is provided a method of controlling a head mounted display (HMD), the method comprising: obtaining a plurality of video frames for displaying by the HMD, wherein first data is encoded into at least one video frame of the plurality of video frames using a first pixel located outside a region displayable using the HMD, the first data being indicative of a focal state of an optics block of the HMD for displaying the at least one video frame; and prior to displaying the at least one video frame, setting the optics block to the focal state indicated by the first data; and displaying the at least one video frame by a display module of the HMD with the optics block set to the focal state indicated by the first data.

In accordance with an aspect of at least one embodiment there is provided a method of controlling a head mounted display (HMD), the method comprising: providing video data for being displayed by the HMD, the video data including an $N^{th}$ frame for displaying to a user on a first focal plane; determining a focal state of an optics block of the HMD that corresponds to the first focal plane; applying an adjustment to the $N^{th}$ frame to compensate for a distortion caused by the optics block, wherein some pixels of the adjusted $N^{th}$ frame lie outside a region displayable by the HMD; encoding first pixel data in a first pixel of the $N^{th}$ frame, the first pixel being outside the region displayable by the HMD, the encoded first pixel data defining a focal state of the optics block for displaying the $N^{th}$ frame on the first focal plane; on the HMD, decoding the encoded first pixel data from the $N^{th}$ frame; setting the optics block to the determined focal state for displaying the $N^{th}$ frame based on the decoded first pixel data; and displaying the $N^{th}$ frame to the user on a display of the HMD.

BRIEF DESCRIPTION OF THE DRAWINGS

The instant disclosure will now be described by way of example only, and with reference to the attached drawings, in which.

DETAILED DESCRIPTION

Figure 1:
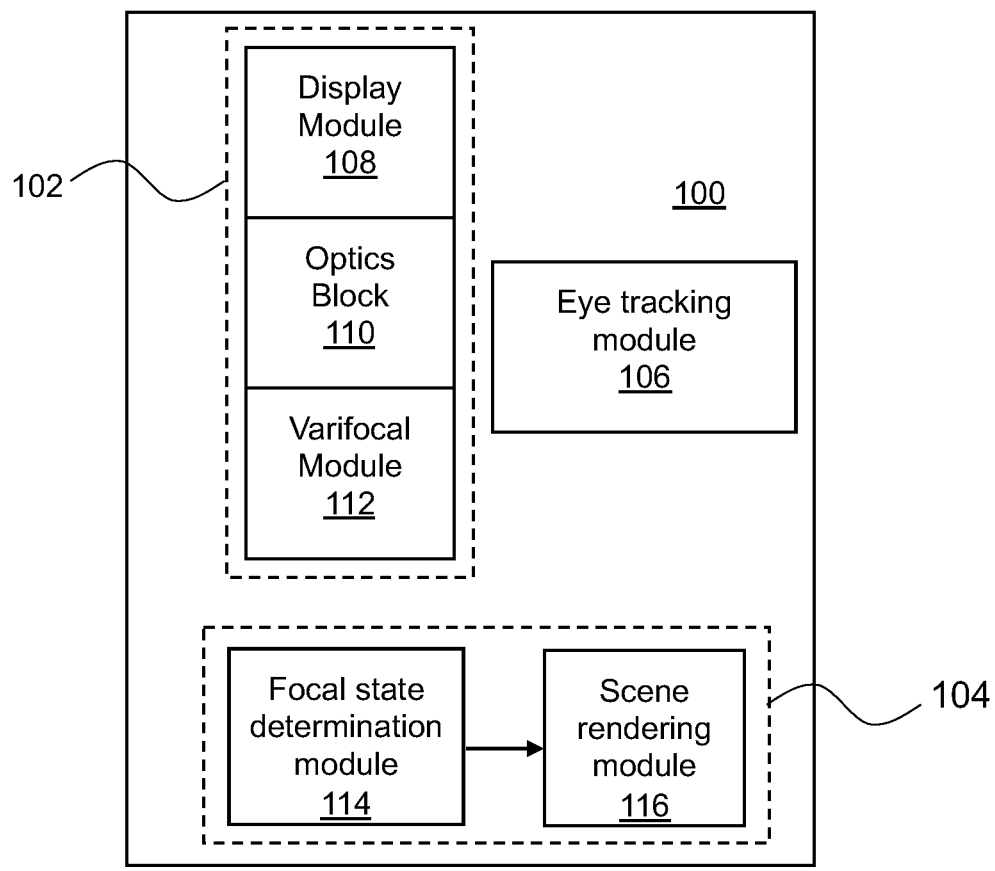
FIG. 1 is a simplified block diagram of a head mounted display (HMD), in accordance with at least one embodiment.

The following description is presented to enable a person skilled in the art to make and use the disclosure and is provided in the context of a particular application and its requirements. Various modifications to the disclosed embodiments will be readily apparent to those skilled in the art, and the general principles defined herein may be applied to other embodiments and applications without departing from the scope of the disclosure. Thus, the present disclosure is not intended to be limited to the embodiments disclosed but is to be accorded the widest scope consistent with the principles and features disclosed herein. Throughout this disclosure, the term "HMD" includes a head-mounted display, a near-eye displays, a wearable display, a virtual reality (VR) display, an augmented-reality (AR) display, a mixed-reality (MR) display, etc. Similar reference numerals denote similar elements throughout the drawings.

To create a comfortable viewing experience, the focus of the HMD should be adjusted based on a location within a virtual scene presented by the HMD and viewed by the user. For instance, a three-dimensional (3D) virtual scene is presented on an electronic display element or display module (e.g., a display panel, a projector, etc.) of the HMD and a focal length of an optics block that directs image light from the electronic display element towards eyes of the user is adjusted using a varifocal element (e.g., an element that mechanically changes a distance between a lens system in the optics block and the electronic display element, an element that changes a shape of one or more lenses in the lens system in the optics block, etc.) based on a location or object within the virtual scene where the user is looking. For example, the HMD tracks the user's eyes to approximate gaze lines and determines a gaze point including a vergence depth as an estimated point of intersection of the gaze lines. The gaze point identifies an object or plane of focus for a particular frame of the virtual scene that is presented to the user by the HMD. The varifocal element then adjusts the focal length of the optics block to focus the optics block at the estimated vergence depth for the gaze point to keep the user's eyes in a zone of comfort as vergence and accommodation change.

The displaying of each frame in a series of frames of video data must be synchronized with changes to the focal state of the optics block in order to provide a natural feeling viewing experience. Image-display data and optics-control data may be provided via separate data paths of an artificial reality system and may then be combined at the user's eyes to produce a displayed scene. Mis-synchronization between the two data paths can occur for a number of reasons, such as for instance due to dropped or missing frames in the image data path, etc. Since each frame of the image data has a specific correction applied thereto for being displayed at a respective focal plane, the occurrence of dropped or missing frames may result in an unnatural viewing experience for the user. For instance, dropping the $N^{th}$ frame in a series of frames may result in the $(N^{th}+1)$ frame being displayed to the user via the HMD using a correction that was intended for the $N^{th}$ frame. Due to this mis-synchronization of the two data paths, the user may notice a distortion, shaking, or another artifact in the displayed scene.

FIG. 1 is a simplified block diagram of an HMD 100, in accordance with an embodiment. The HMD 100 includes a display system 102 for displaying AR/VR content to the user, a controller 104 and optionally an eye tracking module 106. In this specific and non-limiting example, the display system 102 includes a display module 108 for providing image light, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a scanning display, a projector, or a combination thereof. The display system 102 further includes an optics block 110, whose function is to receive the image light from the display module and to provide a virtual image carried by the image light. Optics block 110 has a plurality of focal states, each corresponding to a different focal plane of the displayed virtual image, and may include various lenses, e.g. a refractive lens, a Fresnel lens, a diffractive lens, an active or passive Pancharatnam-Berry phase (PBP) lens, a liquid lens, a liquid crystal lens, a pupil-replicating waveguide, grating structures, coatings, etc. In some embodiments, one or more optical elements in optics block 110 may have one or more coatings, such as anti-reflective coatings.

Magnification of the image light by optics block 110 allows the display module 108 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees), and in some cases all, of the user's field of view.

Optics block 110 may be constructed to correct one or more optical errors. Examples of optical errors include barrel distortion, pincushion distortion, longitudinal chromatic aberration, transverse chromatic aberration, spherical aberration, comatic aberration, field curvature, astigmatism, and so forth. In some embodiments, content provided to display module 108 for display is pre-distorted, and optics block 110 corrects the pre-distortion when it receives image light from display module 108 generated based on the content.

Display system 102 may further include a varifocal module 112, which may be a part of optics block 110, as shown in FIG. 1. The function of varifocal module 112 is to adjust the focus of optics block 110, e.g. to compensate for vergence-accommodation conflict, to correct for vision defects of a particular user, to offset aberrations of optics block 110, etc. Varifocal module 112 includes a varifocal element that mechanically changes a distance between a lens system in the optics block 110 and the display module 108 (e.g., see FIGS. 2A and 2B), a varifocal element that changes a shape of one or more lenses in the lens system in the optics block 110 (e.g., see FIGS. 3A and 3B), etc.

Controller 104 includes a focal state determination module 114 and a scene rendering module 116. Controller 104 may comprise a single processor executing a plurality of software modules, a plurality of processors executing one or more software modules, one or more application-specific integrated circuit (ASIC), or combinations thereof. In some embodiments, some of the processes performed by controller 104 may instead be performed by another processor that is separate from the HMD 100, such as for instance a processor of a console in a virtual reality system.

Focal state determination module 114 determines which focal state of the optics block 110, from a plurality of available focal states, is to be used for displaying each frame of video data. For instance, focal state determination module 114 receives sensed information from various sources, such as for instance eye tracking module 106 of HMD 100 and optionally from additional sources including one or more (not illustrated) position sensors, inertial measurement sensors, locators, etc. Focal state determination module 114 uses the received information to determine vergence depth of a future frame, prior to displaying the future frame. For instance, the future frame is a next frame of video data. The determined vergence depth is used to determine a focal state of optics block 110 for displaying the future frame in such a way that the user's eyes remain in a zone of comfort as vergence and accommodation change. By way of a specific and non-limiting example, focal state determination module 114 may use a table to look up the focal state of optics block 110 corresponding to the determined vergence depth.

Focal state determination module 114 provides determined focal state data to scene rendering module 116, for each frame of video data that is to be displayed via HMD 100. Scene rendering module 116 may apply, to each frame of video data, a pre-distortion specific to the determined focal state that is to be used for displaying each respective frame. When displaying of the frames of video data is synchronized correctly with setting the focal states of the optics block 110, the distortion that is induced by the focal state of optics block 110 corrects the applied pre-distortion, and the resulting virtual scene displayed via the HMD appears natural to the user. Scene rendering module 116 may also add depth of field blur based on the user's gaze, vergence depth (or accommodation depth) etc. Additionally, scene rendering module 116 determines a portion of the content to be displayed on display module 108 based on eye tracking module 106 and optionally one or more position sensors, inertial measurement sensors, locators, etc.

As discussed below in more detail, scene rendering module 116 may also encode some pixel data, termed herein "first pixel data", using a pixel or pixels, herein termed "a first pixel" in some of the frames, or optionally in each frame, of video data. Herein, the term "first" does not imply an order or position of the pixel in the frame, and is rather used as a mere identifier. For instance, the scene rendering module 116 may set a value of a parameter such as at least one of color coordinate or brightness of the first pixel. The parameter value is indicative of the determined focal state of the optics block 110 for correctly displaying that frame of video data. According to an embodiment, the first pixel data may be used for synchronizing the displaying of frames of video data with setting the focal states of the optics block 110. Advantageously, each frame of video data includes first pixel data that identifies the focal state of optics block 110 that is required to display correctly that frame of video data, thereby ensuring that the displaying of each frame is synchronized with the setting of the focal state of optics block 110. In other words, some or all frames may include a "stamp" indicating at which focal length or depth this frame is to be displayed. The "stamp" area may include one or more pixels, and may be invisible to the user. By way of a non-limiting example, the first pixel in each frame of video data is a pixel that is located outside a region of the frame that is displayable by HMD 100.

Figure 2A:
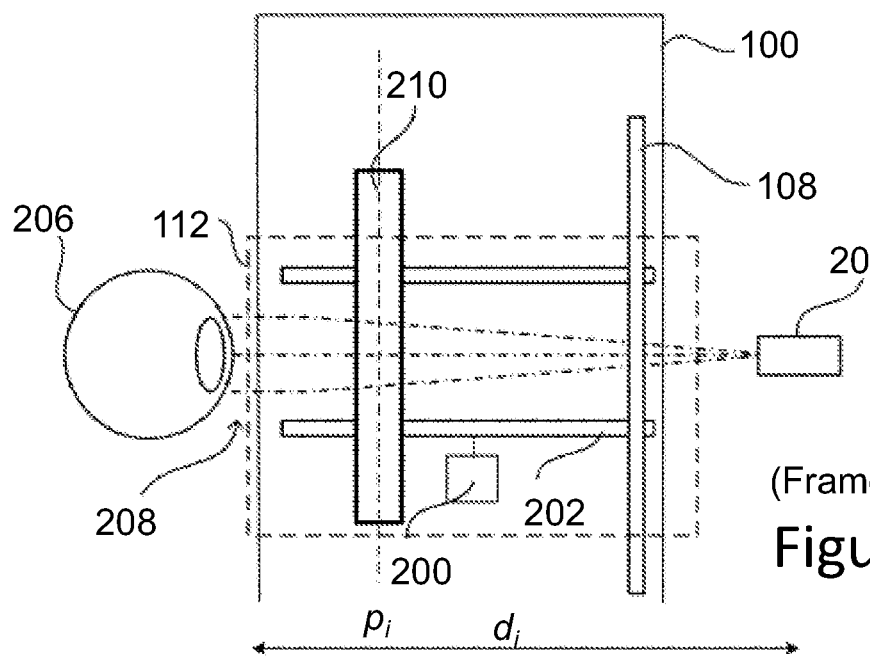
FIGS. 2A and 2B are schematic views of a varifocal module of an HMD including a movable focusing element, in accordance with at least one embodiment.
Figure 2B:
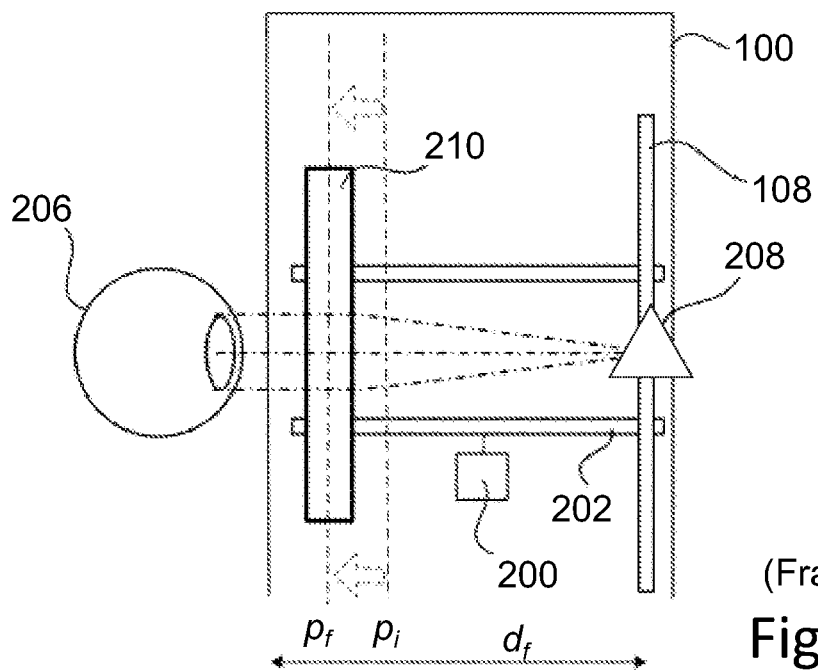

Varifocal module 112 may be implemented in many different ways. Referring to FIGS. 2A and 2B with further reference to FIG. 1, varifocal module 112 includes an optical element 210 movable relative to display module 108 by a translation stage 202 driven by a motor 200. The optical element 210 may be a part of the optics block 110. In some embodiments, the entire optics block 110 is movable by the translation stage 202. The varifocal module 112 may also include other components enabling optics block 110, display module 108, or both, to be translated along an optical axis.

FIG. 2A shows an example of HMD 100 providing focus adjustment for frame N of a virtual scene. In this example, virtual scene includes an object 204 displayed on display module 108 at which the gaze of the user's eye 206 is directed (i.e., verged). A virtual image of object 204 is located a virtual distance $d_i$, behind display module 108, from exit pupil 208. In the example of FIG. 2A, the optical element 210 is in position $p_i$, which provides accommodation for distance $d_i$ to enable comfortable viewing of object 204.

FIG. 2B shows HMD 100 providing focus adjustment for a subsequent frame N+1 of the virtual scene. In this example, object 208 is moved toward the user's eye 206 in the virtual scene. As a result, the virtual image of object 208 is located closer to display module 108. Focal state determination module 114 determines a new focal state of optics block 110 for displaying frame N+1. Motor 200 moves the optical element 210 from position $p_i$ to new position $p_f$ to accommodate user 206 at the new depth $d_f$ for the closer object 208. In one example, each focal state of optics block 110 corresponds to a combination of focal length and eye position and/or orientation, provides accommodation for a range of vergence depths, and is associated with a specific position of the optical element 210.

In order to provide accommodation for a new vergence depth while also leaving time to perform additional calculations without users perceiving a delay, a speed at which motor 200 moves the optical element 210 may be limited by a rate at which the human eye performs accommodation. For example, assuming human eye accommodation has a 10 diopter/sec peak velocity, a 100 diopter/sec2 peak acceleration, and changing the distance between display module 108 and optics block 110 moves a virtual image about 0.5 diopters/mm, motor 200 drives the translation stage 202 with a minimum velocity of 10/0.5=20 mm/sec and a minimum acceleration of 100/0.5=200 mm/sec to prevent a user from perceiving the virtual object 204 at a wrong depth. There are commercially available actuators satisfying the preceding values.

Figure 3A:
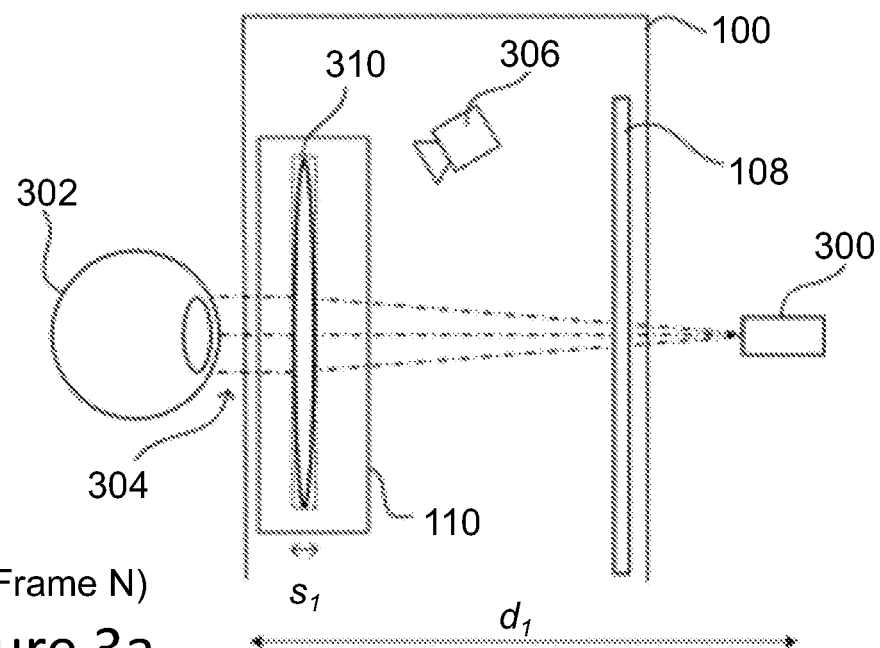
FIGS. 3A and 3B are schematic views of a varifocal module of an HMD including a varifocal element, in accordance with at least one embodiment.
Figure 3B:
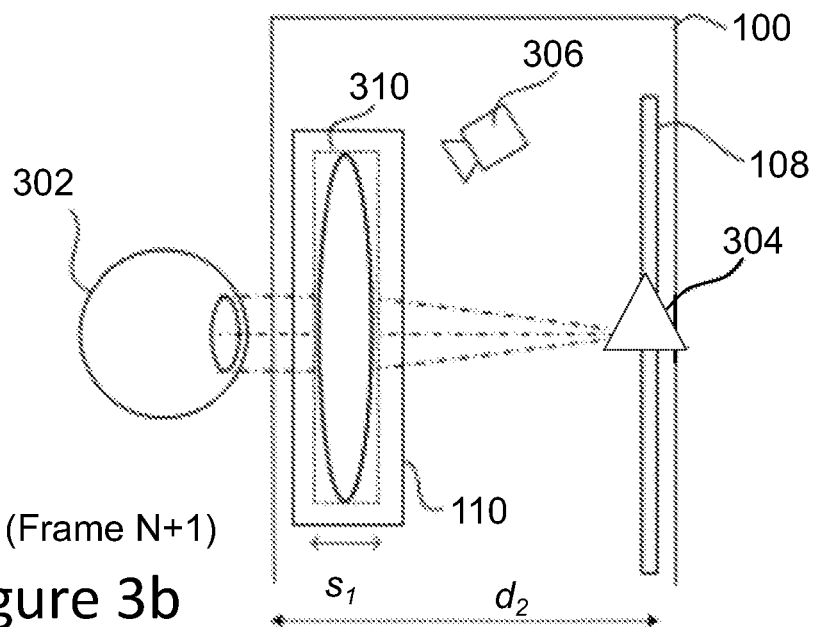

FIGS. 3A and 3B show an alternative example process for adjusting the focal length of optics block 110 using a varifocal optical element 310, e.g. a lens or stack of lenses with tunable or switchable focal length. Similar to the example of FIGS. 2A and 2B, FIG. 3A shows an example of HMD 100 providing focus for a frame N of a virtual scene that includes object 300 displayed on display module 108 at which the gaze of user's eye 302 is directed. A virtual image of object 300 is similarly located a virtual distance $d_i$, which is behind display module 108, from exit pupil 304. In the example of FIG. 3A, varifocal module 112 changes the optical (focusing) power of the varifocal optical element 310, e.g. the shape of one or more lenses of optics block 110, to provide accommodation for distance $d_1$ with lens shape $S_1$ to enable comfortable viewing of object 300.

FIG. 3B shows HMD 100 providing focus for a subsequent frame N+1 of the virtual scene, by changing the optical power of the varifocal optical element 310 of optics block 110. In this example, user's eye 302 may change position and/or orientation to look at object 304 as it moves toward user 302 in the virtual scene. As a result, the virtual image of object 304 is located close to display module 108. In response to the location of object 304 close to the display module 108, which is closer than object 300 in FIG. 3A, the user's eye 302 may rotate to look at object 304. The focal state determination module 114 determines a new focal state of optics block 110 for displaying frame N+1. Varifocal module 114 changes the optical power of the varifocal optical element 310, e.g. by changing shape of one or more lenses from shape $S_1$ to new lens shape $S_2$ to accommodate user 302 at the new closer vergence depth $d_2$. As described above, different focal states of optics block 110 correspond to different focal lengths, providing accommodation for a range of vergence depths, and may be associated with a lens shape or other adjustable property affecting focal length. Examples varifocal optical elements capable of adjusting or switching the focal length include: shape-changing polymer lenses, liquid lenses with electrowetting, Alvarez-Lohmann lenses, deformable membrane mirrors, liquid crystal (electroactive) lenses, Pancharatnam-Berry phase (PBP) lenses, phase-only spatial light modulators (SLM), and other suitable components.

Figure 4:
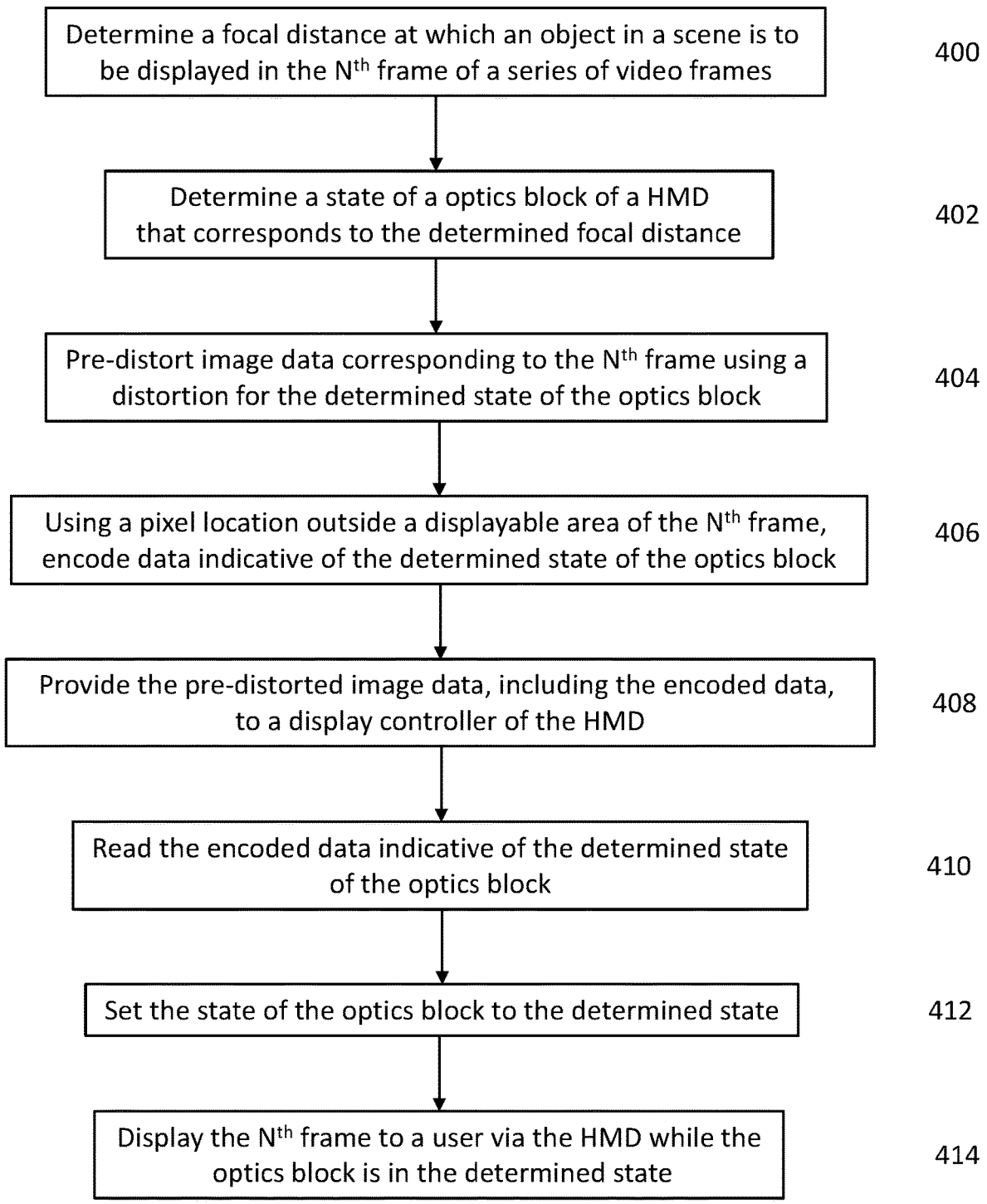
FIG. 4 is a flow chart of a method of synchronizing the frame display with the focal state of the optics block, in accordance with at least one embodiment.

FIG. 4 is a simplified flow chart of a method for synchronizing the displaying of a frame of video data with control of optics block 110 of HMD 100, such that the virtual image is displayed to the user at the correct focal plane. As discussed above, a varifocal system may dynamically vary its focus to bring images presented to a user wearing HMD 100 into focus, which keeps the user's eyes in a zone of comfort as vergence and accommodation change.

A position, an orientation, and/or a movement of HMD 100 may be determined using a combination of locators and sensors, which are described in more detail below with reference to FIGS. 7 and 8. Portions of a virtual scene presented by HMD 100 may be mapped to various positions and orientations of HMD 100, such that a portion of the virtual scene currently being viewed by the user may be determined based on the position, orientation, and movement of HMD 100. At step 400 (FIG. 4), HMD 100 may determine a gaze direction toward a location or an object within the determined portion at which the user is looking, and may use this information to adjust focus for that location or object accordingly, i.e. determine a focal distance at which an object in a scene is to be displayed in the $N^{th}$ frame of a series of video frames. To determine the location or object within the determined portion of a virtual scene at which the user is looking, HMD 100 tracks the position and location of the user's eyes. Thus, HMD 100 determines an eye position or orientation for each eye of the user to produce eye tracking data. For example, eye tracking module 106 of HMD 100 tracks at least a subset of the 3D position, roll, pitch, and yaw of each eye and uses these quantities to determine a 3D gaze point of each eye. Further, information from past eye positions, information describing a position of the user's head, and information describing a scene presented to the user may also be used to determine the 3D gaze point of an eye. The 3D location of the virtual objects may also be determined by the 3D virtual scene to be displayed.

At step 402, a focal state of optics block 110 corresponding to the determined focal distance is determined, which may be based at least partly on the eye tracking data. For instance, focal state determination module 114 uses a table to look up the focal state of optics block 110 that corresponds to the determined focal distance. Alternatively, the focal state is determined in another suitable way, e.g. the focal state may be pre-determined for each frame to be displayed by the display module 108.

At an optional step 404, the $N^{th}$ frame may be pre-distorted by scene rendering module 116 using an adjustment which, when applied to the $N^{th}$ frame, is corrected or cancelled by the determined focal state of optics block 110 such that the $N^{th}$ frame will not appear to be distorted when displayed to the user. In some embodiments, each focal state of optics block 110 is associated with a distortion correction map that corrects for optical error introduced by the focal state of optics block 110. As such, the adjustment that is applied to the $N^{th}$ frame may be specific to the determined focal state of optics block 110 when the $N^{th}$ frame is being displayed by the HMD 100. Control of optics block 110 must therefore be synchronized with the display of the $N^{th}$ image such that optics block 110 is set to the determined focal state at the correct time for displaying the $N^{th}$ frame.

Figure 5:
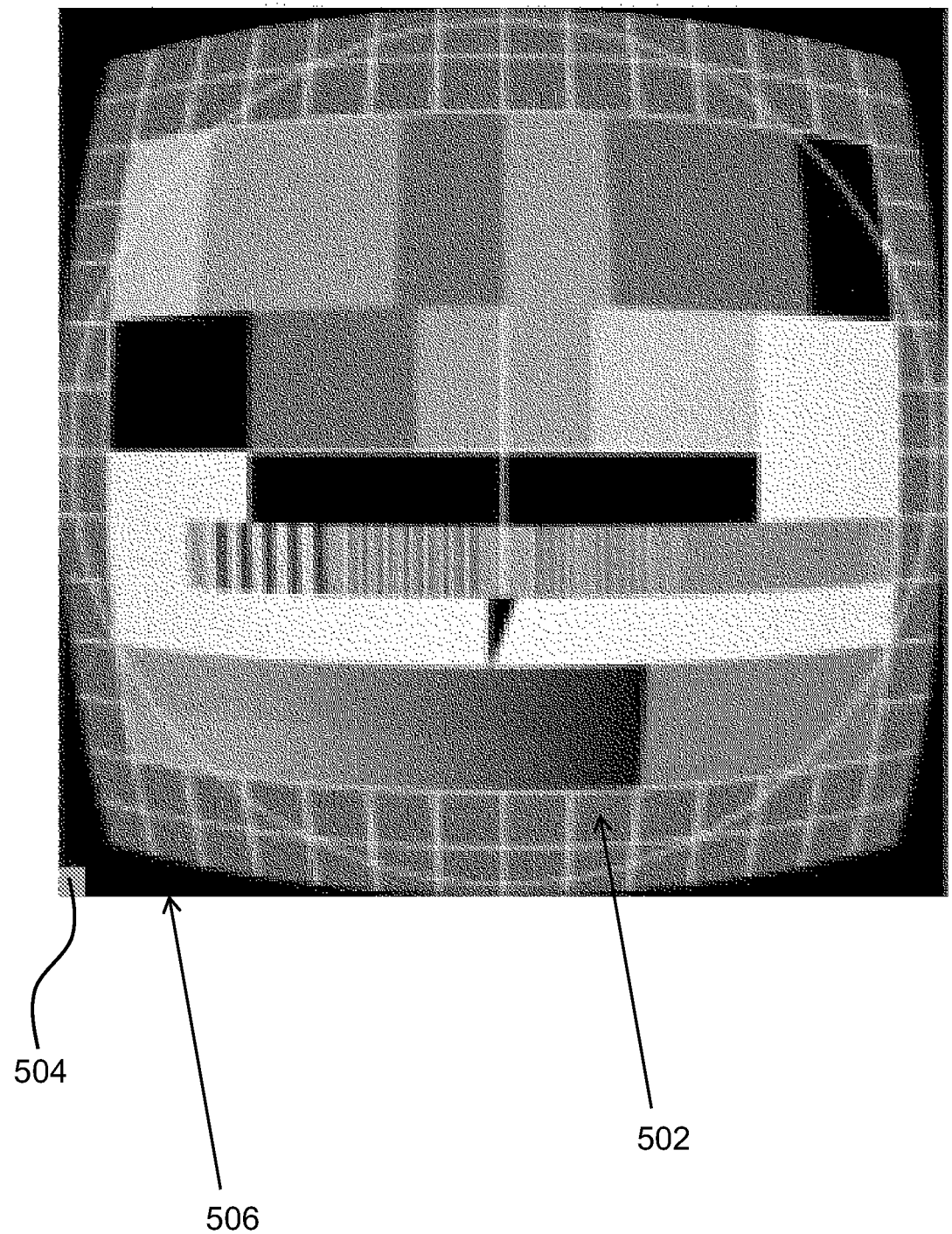
FIG. 5 shows a pre-distorted frame of image data including pixels outside a viewable area according to an embodiment.

To ensure that control of the optics block 110 is synchronized with the displaying of the $N^{th}$ frame, data indicative of the determined focal state of optics block 110 is encoded in the image data for the $N^{th}$ frame at step 406. Referring also to FIG. 5, when scene rendering module 116 applies the adjustment to pre-distort the $N^{th}$ frame, the result is that a pixel or several pixels of the pre-distorted frame 502, e.g. first pixel 504, will be located outside a region 506 that is displayable by HMD 100 after the pre-distortion has been cancelled by optics block 110. In other words, the image data for every frame may be pre-distorted in such a way that some pixels cannot be displayed by the HMD 100, and therefore cannot be viewed by the user. Typically, these non-viewable pixels are left dark to reduce stray light in the optics block 110. In contradistinction, the method that is shown in FIG. 4 uses first pixel 504 to encode information that defines or identifies the determined state of the optics block 110 for displaying the frame of video data that contains the encoded information. More particularly, the encoding that is performed at step 406 includes setting a parameter comprising at least one of color coordinate or brightness of the first pixel 504, wherein a value of the parameter is indicative of the determined focal state of the optics block 110. In this context, the term "first" is merely used as an identifier to refer to a specific pixel and does not imply any order or location of that pixel in the image data.

At step 408, the pre-distorted image data for the $N^{th}$ frame, including the encoded data defining the determined focal state of optics block 110, is provided to a display interface of HMD 100. The value of the parameter of the first pixel 504 is read from the image data stream at step 410 and is used at step 412 to change or otherwise set the focal state of optics block 110 to the determined focal state for displaying the $N^{th}$ frame to the user. In an embodiment, the focal state of optics block 110 is changed during a period of time in which a backlight of the display module 108 does not emit light, or emits only a very small amount of light (e.g., 0.01% illumination) such that the user does not perceive the change taking place.

Finally, at step 414 the $N^{th}$ frame is displayed to the user via HMD 100 while optics block 110 is set to the determined focal state for the $N^{th}$ frame. The process described above is performed for each frame in a series of frames of video image data, such that the user's eyes are kept in a zone of comfort as vergence and accommodation change.

In an embodiment in which optics block 110 supports a sufficiently small number of different focal states, a viewable pixel may be used for encoding the data indicative of the determined focal state of optics block 110, instead of a pixel that is within a region of the frame that cannot be displayed by HMD 100.

Figure 6:
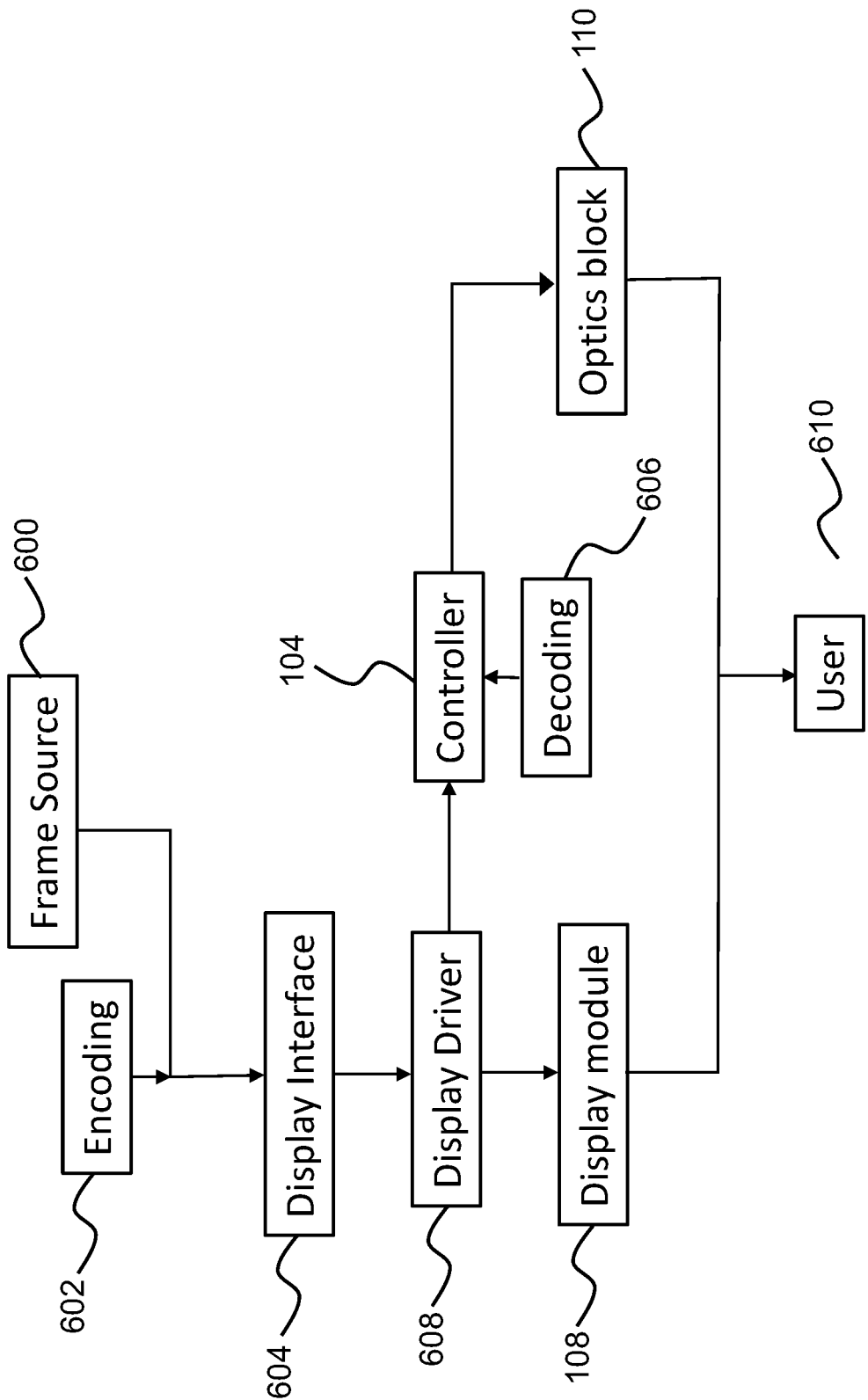
FIG. 6 shows a simplified functional block diagram for an HMD frame-focal state synchronization system, in accordance with at least one embodiment.

Referring now to FIG. 6, shown is a simplified functional block diagram for a process of synchronization of displaying virtual frames with setting the focal states corresponding to focal planes of the displayed virtual imagery. In accordance with at least one embodiment, data signals for displaying the virtual scene to a user and data for setting the focal state of optics block 110 advantageously follow a single data path. Since data signals are provided along a single data path, synchronization between displaying frames of video data and setting the focal state of optics block 110 is maintained even if frames of video data are missing or dropped.

In operation, a frame source 600 (e.g., a console of a virtual reality system) provides content for being displayed via HMD 100. First data indicative of the focal state of optics block 110 is encoded 602 in a first pixel of each frame as described above, and which is either performed on-board or off-board HMD 100. The content including the encoded first data is provided to display system 102 of HMD 100 via a display interface 604. A frame of video data is transmitted to display module 108 for being displayed thereby, and at the same time the first data encoded in the frame of video data is decoded 606 on-board the HMD 100, e.g. the value of the parameter of the first pixel of that frame is read from the data stream by controller 104. The optics block 110 is set to the determined focal state for correctly displaying the frame of video data based on the first data, e.g., a table is used to look up the focal state of optics block 110 based on the value of the parameter of the first pixel that was read from the data stream. The frame of video data is displayed by the display module 108 under the control of a display driver 608, and the optics block 110 is set to the correct focal state for correcting a pre-distortion of the frame of video data, such that a user 610 views the frame of video data absent distortion and/or artefacts, etc.

Figure 7:
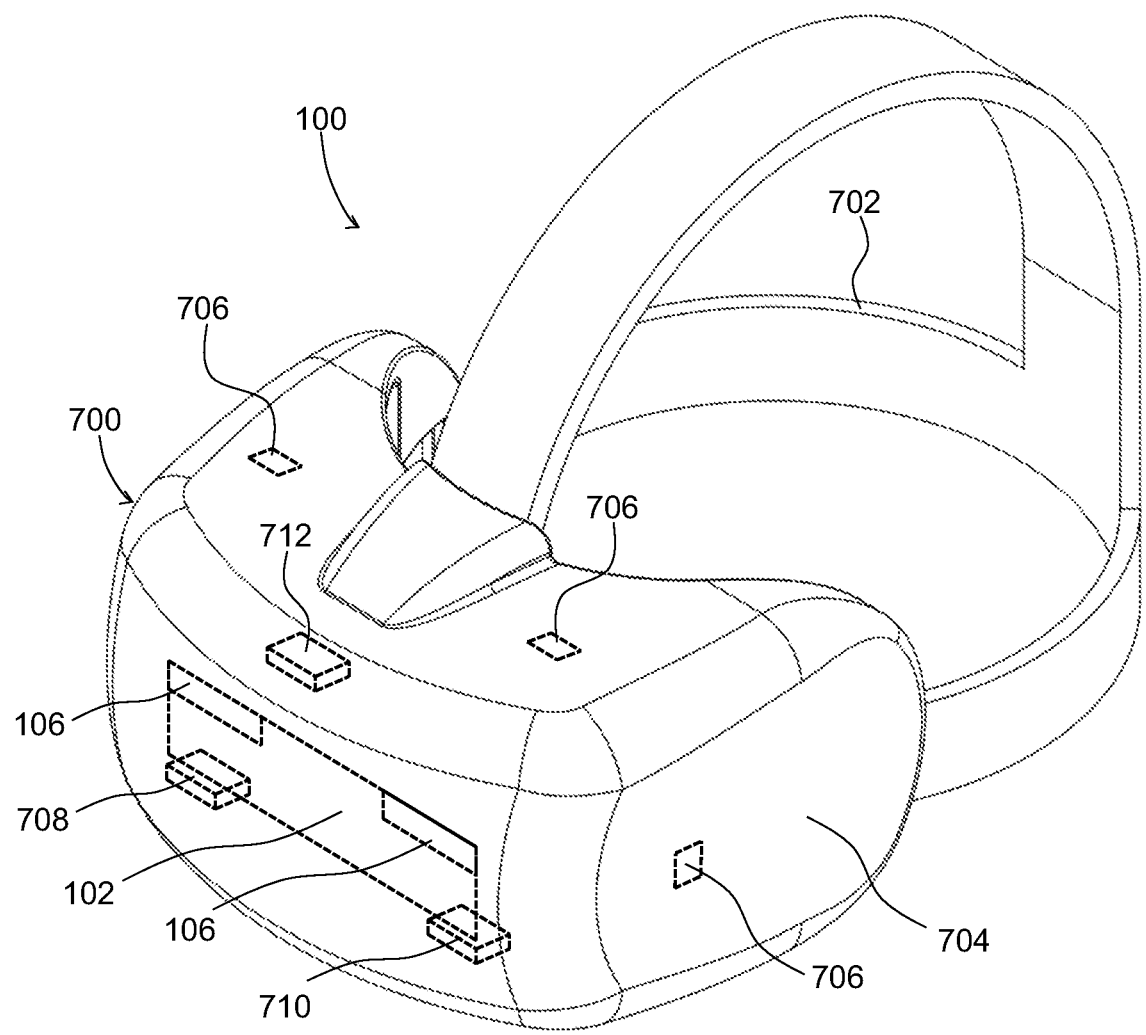
FIG. 7 is a 3D view of a head mounted display according to an embodiment.

Referring now to FIG. 7, shown is an exemplary diagram of the head mounted display (HMD) 100 that is suitable for implementing embodiments disclosed herein. More particularly, HMD 100 is an example of an augmented reality/virtual reality (AR/VR) wearable display system which encloses the user's face, for a greater degree of immersion into the AR/VR environment. The function of the HMD 100 is to augment views of a physical, real-world environment with computer-generated imagery, and/or to generate an entirely virtual 3D imagery. The HMD 100 may include a front body 700 and a band 702. The front body 700 is configured for placement in front of eyes of a user in a reliable and comfortable manner, and the band 702 may be stretched to secure the front body 700 on the user's head. The display system 102 described above may be disposed in the front body 700 for presenting AR/VR imagery to the user. Sides 704 of the front body 700 may be opaque or transparent.

In some embodiments, the front body 700 includes locators 706 and an inertial measurement unit (IMU) 708 for tracking acceleration of the HMD 100, and position sensors 710 for tracking position of the HMD 100. The IMU 708 is an electronic device that generates data indicating a position of the HMD 100 based on measurement signals received from one or more of position sensors 710, which generate one or more measurement signals in response to motion of the HMD 100. Examples of position sensors 710 include: one or more accelerometers, one or more gyroscopes, one or more magnetometers, another suitable type of sensor that detects motion, a type of sensor used for error correction of the IMU 708, or some combination thereof. The position sensors 710 may be located external to the IMU 708, internal to the IMU 708, or some combination thereof.

The locators 706 are traced by an external imaging device of a virtual reality system, such that the virtual reality system can track the location and orientation of the entire HMD 100. Information generated by the IMU 708 and the position sensors 710 may be compared with the position and orientation obtained by tracking the locators 706, for improved tracking accuracy of position and orientation of the HMD 100. Accurate position and orientation information is important for presenting appropriate virtual scenery to the user as the latter moves and turns in 3D space.

The HMD 100 may further include a depth camera assembly (DCA) 712, which captures data describing depth information of a local area surrounding some or all of the HMD 100. To that end, the DCA 712 may include a laser radar (LIDAR), or a similar device. The depth information may be compared with the information from the IMU 708, for better accuracy of determination of position and orientation of the HMD 100 in 3D space.

The HMD 100 may further include the eye tracking module 106 for determining orientation and position of user's eyes in real time. The obtained position and orientation of the eyes also allows the HMD 100 to determine the gaze direction of the user and to adjust the image generated by the display system 102 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers (not shown) built into the front body 700.

Figure 8:
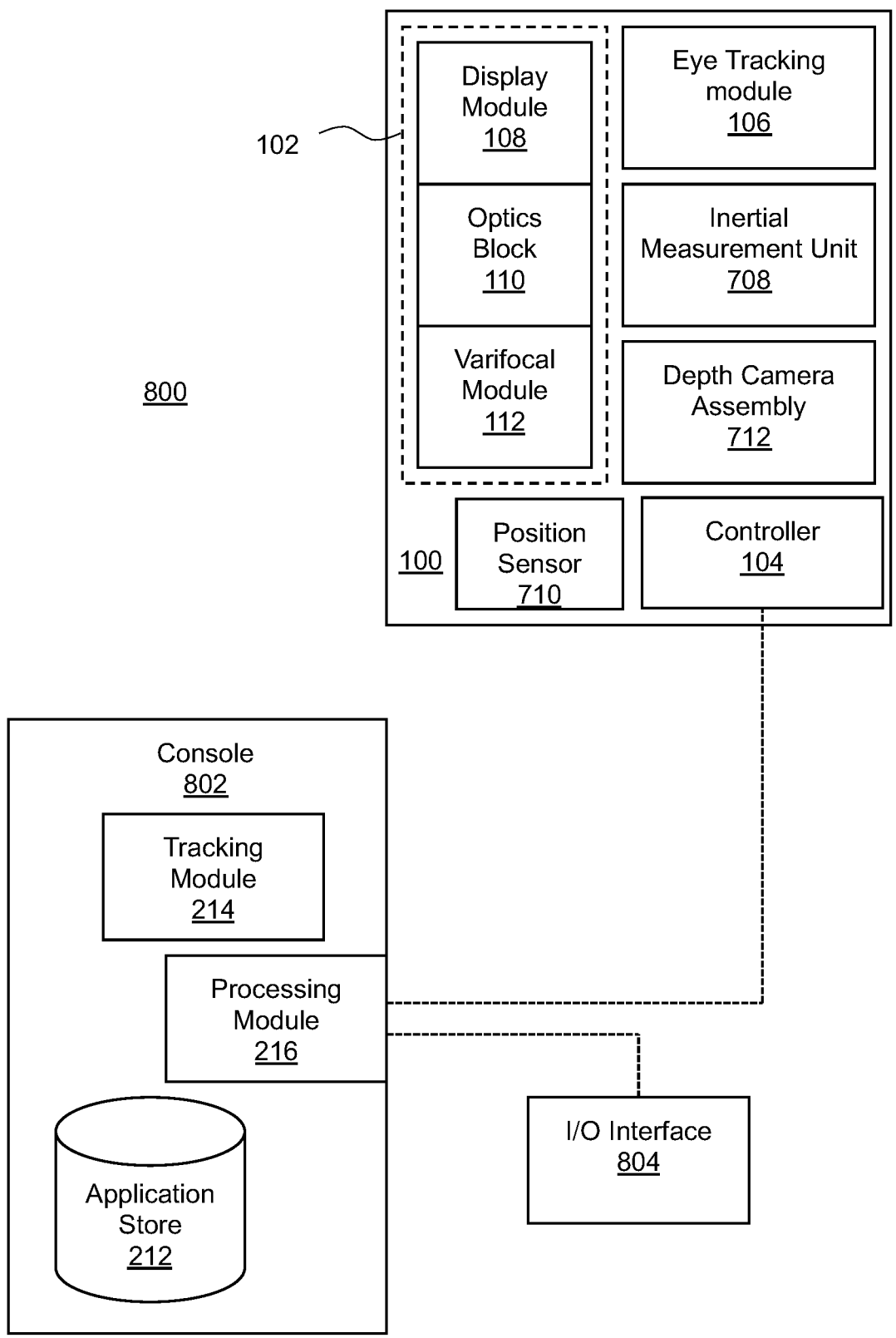
FIG. 8 is a block diagram of an example virtual reality system according to an embodiment.

Referring now to FIG. 8, shown is an AR/VR system 800 including HMD 100 of FIG. 7, an external console 802 storing various AR/VR applications, setup and calibration procedures, 3D videos, etc., and an input/output (I/O) interface 804 for operating the console 802 and/or interacting with the AR/VR environment. HMD 100 may be "tethered" to the console 802 with a physical cable, or connected to the console 802 via a wireless communication link such as Bluetooth®, Wi-Fi, etc. There may be multiple HMDs 100, each having an associated I/O interface 804, with each HMD 100 and I/O interface(s) 804 communicating with the console 802. In alternative configurations, different and/or additional components may be included in the AR/VR system 800. Additionally, functionality described in conjunction with one or more of the components shown in FIGS. 7 and 8 may be distributed among the components in a different manner than described in conjunction with FIGS. 7 and 8 in some embodiments. For example, some or all of the functionality of the console 802 may be provided by HMD 100, and vice versa. HMD 100 may be provided with a processing module capable of achieving such functionality.

As described above with reference to FIG. 7, HMD 100 may include eye tracking module 106 for tracking eye position and orientation, determining gaze angle and convergence angle, etc., IMU 708 for determining position and orientation of the HMD 100 in 3D space, DCA 712 for capturing the outside environment, position sensor(s) 710 for independently determining the position of HMD 100, and display system 102 for displaying AR/VR content to the user. Display system 102 includes display module 108, optics block 110 and varifocal module 112, all of which are discussed above with reference to FIG. 1.

Varifocal module 112 includes a varifocal element that causes optics block 110 to vary the focal plane of a virtual image displayed by HMD 100, to keep the user's eyes in a zone of comfort as vergence and accommodation change. In one embodiment, varifocal module 112 physically changes the distance between display module 108 and optics block 110 by moving display module 108 relative to optics block 110. Alternatively, varifocal module 112 changes the focal plane of the virtual image by adjusting one or more properties of one or more lenses. Example properties of a lens adjusted by the varifocal module 112 include: an optical path length, an index of refraction of a lens medium, a shape of a lens, and so forth. For example, varifocal module 112 changes the focal plane of the virtual image using shape-changing polymer lenses, electrowetting methods with liquid lenses, Alvarez-Lohmann lenses, deformable membrane mirrors, liquid crystal (electroactive) lenses, or phase-only spatial light modulators (SLMs), a Pancharatnam-Berry (PB) switchable lens, or any other suitable component, and any combination thereof. Additionally, moving or translating two lenses of the HMD 100 relative to each other may also be used to vary the focal plane of the virtual image. In an embodiment, a stack comprising a plurality of PB lenses may be configured with binary optical (i.e. focusing/defocusing) power values (e.g., 0.1, 0.2, 0.4, 0.8, 1.6 Diopter, etc.) to provide a plurality of selectable focal planes. Varifocal module 112 may include actuators or motors that move display module 108 and/or optics block 110 on a track, as discussed with reference to FIGS. 2A and 2B, to change the distance between them. Alternatively, varifocal module 112 may include actuators and other components or mechanisms for changing the properties (e.g., by varying an applied electric signal) of one or more lenses included in optics block 110. Varifocal module 112 may be separate from or integrated into optics block 110 in various embodiments.

Optics block 110 may be selectively switched between different focal states of a plurality of available focal states. Each different focal state of optics block 110 corresponds to a different focal plane of the virtual image displayed by HMD 100. Any number of focal states could be provided; however, a limited number of focal states accommodate the sensitivity of the human eye, allowing some embodiments to include fewer focal states.

The I/O interface 804 is a device that allows a user to send action requests and receive responses from the console 802. An action request is a request to perform a particular action. For example, an action request may be an instruction to start or end capture of image or video data or an instruction to perform a particular action within an application. The I/O interface 804 may include one or more not illustrated input devices, such as a keyboard, a mouse, a game controller, or any other suitable device for receiving action requests and communicating the action requests to the console 802. An action request received by the I/O interface 804 is communicated to the console 802, which performs an action corresponding to the action request. In some embodiments, the I/O interface 804 includes a not illustrated IMU that captures calibration data indicating an estimated position of the I/O interface 804 relative to an initial position of the I/O interface 804. In some embodiments, the I/O interface 804 may provide haptic feedback to the user in accordance with instructions received from the console 802. For example, haptic feedback can be provided when an action request is received, or the console 802 communicates instructions to the I/O interface 804 causing the I/O interface 804 to generate haptic feedback when the console 802 performs an action.

The console 802 may provide content to the HMD 100 for processing in accordance with information received from one or more of: the IMU 708, the DCA 712, the eye tracking module 106, and the I/O interface 804. In the example that is shown in FIG. 8, the console 802 includes an application store 806, a tracking module 808, and a processing module 810. Some embodiments of the console 802 may have different modules or components than those described in conjunction with FIG. 8. Similarly, the functions further described below may be distributed among components of the console 802 in a different manner than is described in conjunction with FIGS. 7 and 8.

The application store 806 may store one or more applications for execution by the console 802. An application is a group of instructions that, when executed by a processor, generates content for presentation to the user. Content generated by an application may be in response to inputs received from the user via movement of the HMD 100 or the I/O interface 804. Examples of applications include gaming applications, presentation and conferencing applications, video playback applications, or other suitable applications.

The tracking module 808 may calibrate the AR/VR system 800 using one or more calibration parameters and may adjust one or more calibration parameters to reduce error in determination of the position of the HMD 100 or the I/O interface 804. Calibration performed by the tracking module 808 also accounts for information received from the IMU 708 in the HMD 100 and/or an IMU included in the I/O interface 804, if any. Additionally, if tracking of the HMD 100 is lost, the tracking module 808 may re-calibrate some or all of the AR/VR system 800.

The tracking module 808 may track movements of the HMD 100 or of the I/O interface 804, the IMU 708, or some combination thereof. For example, the tracking module 808 may determine a position of a reference point of the HMD 100 in a mapping of a local area based on information from the HMD 100. The tracking module 808 may also determine positions of the reference point of the HMD 100 or a reference point of the I/O interface 804 using data indicating a position of the HMD 100 from the IMU 708 or using data indicating a position of the I/O interface 804 from an IMU included in the I/O interface 804, respectively. Furthermore, in some embodiments, the tracking module 808 may use portions of data indicating a position or the HMD 100 from the IMU 708 as well as representations of the local area from the DCA 712 to predict a future location of the HMD 100. The tracking module 808 provides the estimated or predicted future position of the HMD 100 or the I/O interface 804 to the processing module 810.

The processing module 810 may generate a 3D mapping of the area surrounding some or all of the HMD 100 ("local area") based on information received from the HMD 100. In some embodiments, the processing module 810 determines depth information for the 3D mapping of the local area based on information received from the DCA 712 that is relevant for techniques used in computing depth. In various embodiments, the processing module 810 may use the depth information to update a model of the local area and generate content based in part on the updated model.

The processing module 810 executes applications within the AR/VR system 800 and receives position information, acceleration information, velocity information, predicted future positions, or some combination thereof, of the HMD 100 from the tracking module 808. Based on the received information, the processing module 810 determines content to provide to the HMD 100 for presentation to the user. For example, if the received information indicates that the user has looked to the left, the processing module 810 generates content for the HMD 100 that mirrors the user's movement in a virtual environment or in an environment augmenting the local area with additional content. Additionally, the processing module 810 performs an action within an application executing on the console 802 in response to an action request received from the I/O interface 804 and provides feedback to the user that the action was performed. The provided feedback may be visual or audible feedback via the HMD 100 or haptic feedback via the I/O interface 804.

In some embodiments, based on the eye tracking information (e.g., orientation of the user's eyes) received from the eye tracking module 106, the processing module 810 determines resolution of the content provided to the HMD 100 for presentation to the user on the display module 108. The processing module 810 may provide the content to the HMD 100 having a maximum pixel resolution on the display module 108 in a foveal region of the user's gaze. The processing module 810 may provide a lower pixel resolution in other regions of the display module 108, thus lessening power consumption of the AR/VR system 800 and saving computing resources of the console 802 without compromising a visual experience of the user. In some embodiments, the processing module 810 can further use the eye tracking information to adjust where objects are displayed on the display module 108 to prevent vergence-accommodation conflict and/or to offset optical distortions and aberrations.

Controller 104 includes focal state determination module 114 and scene rendering module 116, both of which are discussed above with reference to FIG. 1. Scene rendering module 116 receives content for displaying a virtual scene from processing module 810 and provides the content for display on the display module 108. Additionally, scene rendering module 116 adjusts the content based on information from eye tracking module 106, IMU 708, and position sensors 710. The scene rendering module 116 determines a portion of the content to be displayed on the display module 108 based on one or more of tracking module 808, position sensors 710, or IMU 708. Focal state determination module 114 determines which focal state of the optics block 110, from a plurality of available focal states, is to be used for displaying each frame of video data and passes to scene rendering module 116 data relating thereto. Scene rendering module 116 encodes focal state data in each frame of video data using a first pixel of said each frame. In this way, each frame of video data for display on display module 108 includes data for use in setting optics block 110 to a focal state that will result in the respective frame being displayed without distortion.

In the present disclosure, it is understood that a word appearing in the singular encompasses its plural counterpart, and a word appearing in the plural encompasses its singular counterpart, unless implicitly or explicitly understood or stated otherwise. For instance, unless the context indicates otherwise, a singular reference, such as "a" or "an" means "one or more". Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. It is also to be understood, where appropriate, like reference numerals may refer to corresponding parts throughout the several views of the drawings for simplicity of understanding.

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments of the disclosure can be made while still falling within the scope of the disclosure. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the disclosure and does not indicate a limitation on the scope of the disclosure unless otherwise claimed.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the disclosure are applicable to all aspects of the disclosure and may be used in any combination. Likewise, features described in non-essential combinations may be used separately (not in combination).

What is claimed is:

1. A head mounted display (HMD) comprising:
a display module for providing image light;
an optics block configured to receive the image light from the display module and to provide a virtual image carried by the image light, the optics block having a plurality of focal states each corresponding to a different focal plane of the displayed virtual image;
a varifocal module configured to selectably switch the optics block between different focal states of the plurality of focal states; and
a controller configured to:
receive a frame of video data for displaying by the HMD, the frame including pixel data encoded in a first pixel of the frame, the pixel data being indicative of one of the plurality of focal states of the optics block; and, prior to displaying the frame using the HMD:
read the pixel data; and
use the varifocal module to set the optics block to the focal state indicated by the pixel data.

2. The HMD of claim 1, wherein the first pixel is located outside a displayable region of the frame.

3. The HMD of claim 1, comprising an eye tracking module for determining at least one of eye position or orientation of the user to produce eye tracking data, wherein the focal state of the optics block is determined based at least partly on the eye tracking data.

4. The HMD of claim 1, wherein the varifocal module comprises an optical element movable relative to the display module so as to vary a distance therebetween.

5. The HMD of claim 1, wherein the varifocal module comprises a varifocal optical element having a controllable optical power.

6. The HMD of claim 5, wherein the varifocal optical element comprises at least one of: a shape-changing polymer lens, a liquid lens, an Alvarez-Lohmann lens, a deformable membrane mirror, a liquid crystal (electroactive) lens, a phase-only spatial light modulator (SLM), or a Pancharatnam-Berry (PB) switchable lens.

7. A method of controlling a head mounted display (HMD), the method comprising:
    obtaining video data comprising a frame for displaying by the HMD; and
    encoding first pixel data into a first pixel of the frame, the encoded first pixel data being indicative of a focal state of an optics block of the HMD for displaying the frame, the focal state selected from a plurality of focal states of the optics block, each focal state corresponding to a different focal plane of a virtual image generated based on the frame of the video data.

8. The method of claim 7, wherein the first pixel is located outside a displayable region of the frame.

9. The method of claim 7, comprising obtaining the video data and encoding the first pixel data into a first pixel of each frame of a plurality of frames of video data.

10. The method of claim 7, comprising reading the first pixel data encoded in the first pixel of the frame and, prior to displaying the frame, setting the optics block to the focal state indicated by the first pixel data encoded in the first pixel.

11. The method of claim 10, wherein setting the optics block to the focal state is performed during a period of time in which the display module of the HMD substantially does not emit light.

12. The method of claim 10, wherein setting the optics block to the focal state indicated by the first pixel data comprises changing a distance between an optical element of the optics block and a display module of the HMD.

13. The method of claim 10, wherein setting the optics block to the focal state indicated by the first pixel data comprises changing optical power of a varifocal optical element of the optics block.

14. The method of claim 7, wherein encoding the first pixel data comprises setting a parameter comprising at least one of color coordinate or brightness of the first pixel, wherein a value of the parameter is indicative of one of the plurality of focal states of the optics block.

15. The method of claim 7, comprising using an eye tracker to determine at least one of eye position or orientation of the user to produce eye tracking data, wherein the focal state of the optics block is determined based at least partly on the eye tracking data.

16. A method of controlling a head mounted display (HMD), the method comprising:
    obtaining a plurality of video frames for displaying by the HMD, wherein first data is encoded into at least one video frame of the plurality of video frames using a first pixel located outside a region displayable using the HMD, the first data being indicative of a focal state of an optics block of the HMD for displaying the at least one video frame; and
    prior to displaying the at least one video frame, setting the optics block to the focal state indicated by the first data; and
    displaying the at least one video frame by a display module of the HMD with the optics block set to the focal state indicated by the first data.

17. The method of claim 16, comprising using an eye tracker to determine at least one of eye position or orientation of the user to produce eye tracking data, wherein the focal state of the optics block is determined based at least partly on the eye tracking data.

18. The method of claim 16, wherein the focal state is selected from a plurality of focal states of the optics block, and wherein the first data is encoded as a value of a parameter comprising at least one of color coordinate or brightness of the first pixel, the value of the parameter being indicative of one of the plurality of focal states of the optics block.

19. The method of claim 16, wherein setting the optics block to the focal state indicated by the first data comprises changing a distance between an optical element of the optics block and a display module of the HMD.

20. The method of claim 16, wherein setting the optics block to the focal state indicated by the first pixel data comprises changing optical power of a varifocal optical element of the optics block.

* * * * *